US007007460B2

(12) United States Patent
Frieden et al.

(10) Patent No.: US 7,007,460 B2
(45) Date of Patent: Mar. 7, 2006

(54) APPARATUS AND METHOD FOR ACCELERATED EXHAUST SYSTEM COMPONENT HEATING

(75) Inventors: Douglas E. Frieden, Sterling Heights, MI (US); David J. Cleary, West Bloomfield, MI (US); Sanjeev Manubhai Naik, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/638,884

(22) Filed: Aug. 11, 2003

(65) Prior Publication Data

US 2005/0034449 A1 Feb. 17, 2005

(51) Int. Cl.
*F01N 3/00* (2006.01)

(52) U.S. Cl. ............................ 60/284; 60/274; 60/286; 60/300

(58) Field of Classification Search .................. 60/274, 60/284, 286, 300, 303
See application file for complete search history.

(56) References Cited

U.S. PATENT DOCUMENTS

| | | | | |
|---|---|---|---|---|
| 4,780,619 | A | 10/1988 | Campbell et al. | 307/10 R |
| 5,265,418 | A | 11/1993 | Smith | 60/284 |
| 5,321,231 | A * | 6/1994 | Schmalzriedt et al. | 219/497 |
| 5,325,038 | A * | 6/1994 | Banzai et al. | 320/135 |
| 5,689,952 | A * | 11/1997 | Kato et al. | 60/277 |
| 5,773,964 | A | 6/1998 | Peter | 322/20 |
| 5,822,983 | A * | 10/1998 | Ikeda | 60/284 |
| 5,836,151 | A | 11/1998 | Atanasyan et al. | 60/274 |
| 6,003,304 | A | 12/1999 | Swanson et al. | 60/274 |
| 6,052,988 | A * | 4/2000 | Ikeda | 60/284 |
| 6,079,204 | A * | 6/2000 | Sun et al. | 60/274 |
| 6,418,713 | B1 | 7/2002 | Gale et al. | 60/284 |
| 6,470,985 | B1 * | 10/2002 | Inada et al. | 180/65.3 |
| 6,594,990 | B1 | 7/2003 | Kuenstler et al. | 60/295 |
| 6,657,315 | B1 | 12/2003 | Peters et al. | 290/40 C |
| 6,829,888 | B1 * | 12/2004 | Kuenstler et al. | 60/284 |
| 2002/0124554 | A1 | 9/2002 | Majima | 60/284 |
| 2003/0196631 | A1 | 10/2003 | Dehrmann et al. | 123/192.1 |

FOREIGN PATENT DOCUMENTS

| | | |
|---|---|---|
| DE | 199 25 100 | 12/2000 |
| EP | 1 035 304 | 9/2000 |

* cited by examiner

*Primary Examiner*—Binh Q. Tran
(74) *Attorney, Agent, or Firm*—Kathryn A. Marra

(57) ABSTRACT

Accelerated heating of automotive exhaust system components is effected by controlling the application of supplemental electrical loads to the vehicle electrical system thereby increasing engine load and increasing exhaust heat. Alternative strategies are disclosed for implementing the invention through control of electrical and engine management system parameters.

22 Claims, 3 Drawing Sheets

22 A 41 $I_L$ B V+ 45 34 C 44 27 GND 53 18 51 $I_F$ VOLTAGE REGULATOR 37 31 29 49 21 43 IGNITION CONTROLLER PCM $I_F$ SENSE 61 32 33 23 25 27 24 17 ENGINE TCC TRANS 19 10 11 13 15

APPARATUS AND METHOD FOR ACCELERATED EXHAUST SYSTEM COMPONENT HEATING

TECHNICAL FIELD

The present invention is related to managing cold start emissions from automobiles. More particularly, the invention facilitates a reduction in the time it takes for the exhaust system components to warm-up during cold starts.

BACKGROUND OF THE INVENTION

It is known in the area of internal combustion engine emissions control that the time during which an engine is running prior to the certain emissions control components reaching critical operating temperatures is a significant contributor to overall hydrocarbon tailpipe emissions. This is generally true because the catalysts used to treat exhaust gases are inefficient at lower temperatures and because the exhaust gas sensors used for closing the loop on air-fuel ratio have not yet reached their operating temperature and thus cannot be used. Additionally, the engine is typically calibrated with rich air-fuel ratios to avoid misfires and partial burns, which further contributes to the hydrocarbon emissions. It is also generally well understood that tailpipe emissions during cold starts can be significantly reduced if the time for such components to reach acceptable performance temperatures can be reduced.

There are known systems that rely upon air injection reaction pumps for feeding air into the exhaust for post combustion hydrocarbon combustion and heat generation upstream of the catalytic converter. Such systems come with expense, mass and reliability penalties.

In attempting to address these needs and shortfalls, approaches have been proposed for reducing the time it takes to reach critical temperatures. It is known that increasing the engine speed increases the thermal output to the exhaust and can effect a reduction in the time for exhaust components to reach these critical temperatures. However, excessively high engine speeds may be objectionable to a vehicle operator. It is also known that retarding the spark timing serves to increase the thermal energy transported to the exhaust system. However, modern engines have limited spark retard authority as too much retard contributes to combustion instability.

It is also known that increasing the engine load and thus the amount of fuel consumed per combustion cycle also increases the heat output to the exhaust. Systems have been proposed for increasing engine load by overexciting a vehicle starter/alternator in combination with spark retard and fuel enleanment. No teaching is given of what is meant by overexciting the starter/alternator and no teaching is given to indicate where the additional energy is dissipated. However, such an arrangement suggests energy dissipation internal to the machine, which may mean unregulated operation and damaging voltage/current levels. This represents a potentially damaging or wasteful energy dump.

Electrically heated catalysts have also been proposed as a means for accelerating the heating of the catalyst. Such systems demand significant electrical energy to effect rapid heating. Energizing electrically heated catalysts for direct heating thereof has been proposed by disconnection of normal vehicle electrical loads from the generator and generator operation in an unregulated mode to rapidly power such a catalyst heater.

SUMMARY OF THE INVENTION

Therefore, what is needed is a way to effect a reduction in warm-up time for certain exhaust components so that improvements to cold start emissions can be realized. Preferably, solutions will not come with significant expense, mass or reliability issues. Additionally, a solution that provides for normal electrical system operation, including protective regulation thereof, is also desired. Moreover, incorporated utilization of the otherwise wasted, dissipated energy in advancing such solutions is generally desirable.

In accordance with certain aspects of the present invention, an apparatus for accelerating the heating of exhaust system components during cold start conditions in an automobile is provided. Such an apparatus includes an engine controller effective to control engine speed by adjusting the engine load operating point. A generator driven by the internal combustion engine provides a regulated output. The controller is adapted for determining when accelerated heating of the exhaust system components is required and is effective to electrically couple a supplemental electrical load to the generator when accelerated heating of exhaust system components is required.

In accordance with another aspect of the present invention, a method for accelerated heating of exhaust system components in an automobile is provided. The automobile includes an internal combustion engine, an engine controller and an electric generator drivingly coupled to the engine and having an electrical output. A supplemental electrical load is provided to the generator output to provide a torque load to the engine while engine speed is controlled to a predetermined engine speed profile. Engine speed may be controlled, for example, by making fueling adjustments or by making adjustments to the supplemental electrical load.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
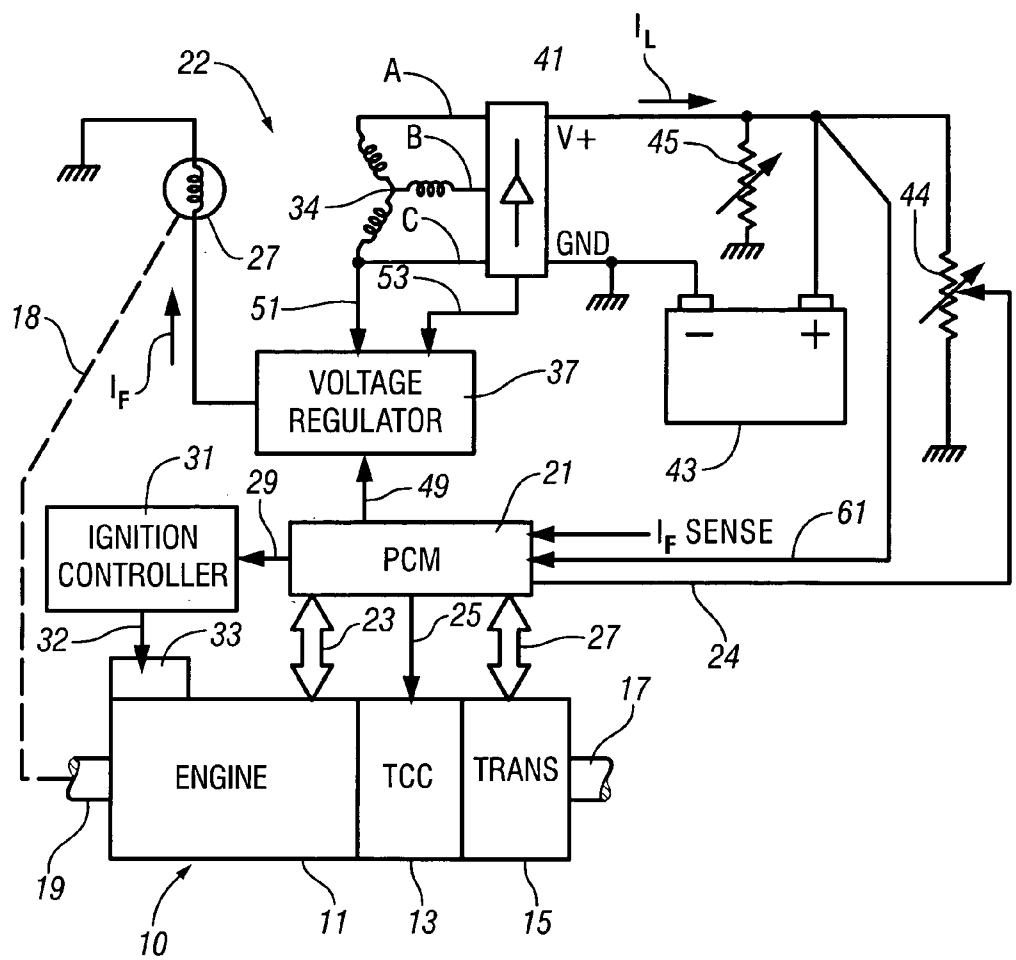
FIG. 1 is a schematic illustration of a vehicle powertrain and electrical system in accordance with one embodiment of the present invention.

An exemplary automotive environment in which certain preferred embodiments of the present invention may be practiced is generally illustrated and described with respect to FIG. 1. A motor vehicle includes a powertrain generally labeled 10 and more specifically comprising an internal combustion engine 11 coupled to a multi-ratio automatic transmission 15 through an engaged torque converter clutch 13. Transmission 15 has an output shaft 17 which in turn is mechanically coupled to at least one drive wheel through differential and final drive gear sets (not shown). Engine 11 also has an accessory drive shaft 19 for driving a plurality of engine driven accessories by way of a pulley and belt system (not shown). Such engine powered accessories may include, for example, air conditioning compressors, intake air superchargers and vehicle electrical system generators.

Engine and transmission control functions are implemented by way of a computer based powertrain control module (PCM) 21 as illustrated in the figure. PCM includes a microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. PCM 21 functions to acquire data from a variety of sensors and control a variety of actuators, respectively, of the powertrain system. Therefore, PCM 21 is shown generally in bi-directional interface with engine 11 and transmission 15 via lines 23 and 27. Also shown is TCC actuator line 25 which commands the torque converter clutch engaged or disengaged. Among the various parameters that may be sensed by PCM 21 are transmission oil sump and engine coolant temperatures, engine speed, transmission input or impeller speed and transmission output speed, and throttle position. Various actuators that may be controlled by the PCM 21 include fuel injectors, idle air control motor, idle speed control motor, electronic throttle control motor, and transmission oil pressure regulator and shift control solenoids. Idle air control motors, idle speed control motors, electronic throttle control motors and spark timing, variously and in combination, may be utilized by the PCM to control engine idle speed in accordance with well known speed control feedback arrangements. Engine speed is conventionally controlled in such a feedback arrangement wherein deviations from target speed are compensated. Increase in engine torque (i.e. load torque seen by the output shaft 17 or accessory drive shaft 19 of the engine), such as may be experience when the operator shifts from park to drive and couples brake or road torque to the drivetrain, or when the accessory drive shaft is loaded by the A/C compressor being commanded on, would tend to cause an engine speed sag. The engine speed control essentially adapts the engine output torque through intake air/fuel and spark timing controls in order to maintain target engine speed. PCM 21 also provides an electronic spark timing (EST) signal output on line 29 to ignition controller 31. Ignition controller 31 responds to EST signal to provide timed output of drive signals to spark plugs 33 for combusting the fuel charge in the cylinders. EST signal may be adapted to provide spark timing signals over a wide range of timing. Normally, it is desirable that spark timing occur before piston top dead center and, with increasing engine speed it is typical to further advance spark timing. However, it is known to those skilled in the art to retard spark timing to after top dead center to quickly limit engine output torque and during cold starts to increase exhaust gas temperature, in essence trading engine output torque for heat.

As alluded to, accessory drive shaft 19 is operatively coupled as exemplified by the broken line 18 to the vehicle generator, preferably an alternator, designated generally by the numeral 22. More specifically, the rotor (not shown) of the alternator 22 is belt driven, for example, at an alternator-to-engine speed ratio of 3:1. In accordance with the exemplary preferred embodiment of the invention, alternator 22 is of the type commonly referred to as a Lundell machine. Structurally, a Lundell machine comprises a rotor shaft and core upon which is wound a field coil 27. Surrounding the field coil and also secured to the shaft for rotation therewith is a pair of opposing claw pole members characterized by interdigitated axially extending fingers. Alternate ones of said fingers thereby provide opposite magnetic poles when the field coil is energized. The rotor as described is surrounded by a stator assembly generally comprised of a plurality of stacked, substantially annular, laminations of steel. A three phase Y-winding 34 is carried by the lamination stack. The rotation of the energized rotor induces a three phase AC output voltage at winding terminals A, B and C. The alternator provides a load torque to the accessory drive shaft and hence to the engine crankshaft in accordance generally with the speed of rotation, field excitation current, and power output from the stator winding.

Stator winding 34 is coupled to a three-phase full wave bridge rectifier 41, which provides a DC output voltage across terminals V+ and GND as illustrated. V+ and GND are coupled to the positive (+) and negative (−) terminals, respectively, of battery 43. Also coupled between V+ and GND is nominal electrical load 45 schematically illustrated in the figure as a variable resistance. Nominal electrical load as used herein is generally characterized as aggregated electrical loads that absent the implementation of the present invention are active during the cold start as part of the conventional engine or other vehicle systems controls or as invoked active by vehicle operator requests. Nominal engine loading corresponds in part to nominal electrical loading of the generator due to the coupling of the generator to the engine output. To illustrate, upon starting the vehicle the nominal electrical load may comprise the PCM and other controllers, fuel pump, fuel injectors, suspension leveling pumps, accessory loads such as sound systems and HVAC blower motors and a charging battery. It is noted that certain relatively significant electrical loads, such as glass defrosters and heated seats, conventionally require operator request upon each ignition cycle in order to become active. Such loads, if invoked by the operator, are also included in the nominal electrical load.

Voltage regulator 37 is operative to vary the field current $I_F$ such as through pulse width modulation (PWM) of system voltage across field coil 27. Voltage regulator 37 regulates the output voltage of the stator to a set-point voltage sufficient to maintain the battery state of charge and satisfy the active vehicle loads 45. Preferably, the regulator 37 is a digital regulator utilizing apparatus which responds to the relative magnitudes of an input voltage signal on line 49 and the desired regulated output voltage of the alternator, or the "set-point." The input voltage signal on line 49 is substantially equivalent to the alternator output voltage as measured by the voltage signal on line 61 coupled to the battery positive terminal.

When the actual output voltage of the alternator is below the desired set-point, the regulator energizes the field winding with a semiconductor switch (not shown) that is connected in series with the field winding 27 of the alternator 25. The semiconductor switch is operated at a predetermined pulse width which is increased when the actual output voltage is below the set-point and decreased when the actual output voltage is above the set-point.

Line 51 provides one phase voltage signal to the voltage regulator for determination of rotation and frequency thereof for use in its determination of rotor speed which may be used to indicate whether the field coil should be energized and if so, to determine an appropriate mode of operation. For example, the field coil is desirably open when the engine is not running and hence the rotor is not rotating. Also, at low rotational speeds, such as those encountered as the vehicle engine is being started, it is desirable to limit the excitation pulse width to a minimal value so as to reduce undesirable additional load torque during engine cranking. The speed information supplied by the one phase voltage signal on line 51 allows the voltage regulator to discern such situations. Additionally, conductor 53 is tied directly to the diode bridge output and provides an input to the voltage regulator that is somewhat redundant to the signal on line 49 as follows. If a voltage signal appears on line 49 in excess of a preset threshold (substantially 4 to 6 volts DC), then selection circuitry in the regulator will use the voltage signal on line 49 in the regulation function. If, however, the voltage threshold is not met, such as may be the case where the voltage signal is lost due to conductor 49 being disconnected or open, the voltage regulator selection circuitry will use the diode bridge output voltage on conductor 53 in the regulation function.

Alternative vehicle powertrain architectures are applicable environments for practicing the present invention. For example, hybrid powertrains, both serial or parallel, wherein an electrical generator is drivingly coupled to an internal combustion engines may be utilized. In fact, any configuration wherein an electrical generator is coupled to an internal combustion engine is equally applicable.

In accordance with the present invention, coupled between V+ and GND is supplemental electrical load 44 schematically illustrated in the figure as a variable resistance controlled in accordance with an output signal from the PCM on line 24. Supplemental electrical load as used herein is an electrical load invoked in accordance with the control of the present invention and in addition to the nominal electrical load. In accordance with one embodiment of the present invention, the supplemental electrical load is activated and controlled such that the net vehicle electrical load is at a predetermined point such as the maximum alternator output operating point as explained further at a later point herein. The total load current, that is to say the net current provided by the stator winding is labeled $I_L$ in the figure and comprises the nominal electrical loads and the supplemental electrical loads. Supplemental electrical loads may advantageously comprise pre-existing vehicle loads, for example, vehicle accessory loads having a function independent from its adapted function as a supplemental electrical load in accordance with the present invention. Supplemental electrical loads may also comprise electrical loads added predominantly to function as the supplemental electrical load in accordance with the present invention. Supplemental electrical load may take the form of a power resistor that is switched into and out of circuit, for example by way of a relay, solid state driver or any type of appropriate switching mechanism. A variable power resistor (e.g. rheostat) may be utilized as supplemental electrical load to allow control of the load presented. Additionally, and most appropriately implemented by way of solid state switching, supplemental electrical load may be pulse width modulated into the circuit to achieve a controllable range of effective electrical loads. Load switching may be accomplished by way of relays controlled by PCM outputs or directly through power transistors or drivers within the PCM.

Since it is generally anticipated that the power dissipation through such a supplemental load may be substantial (i.e. on the order of several hundred watts to 1 kilowatt and more), heat transfer may be critical, particularly with a supplemental load that is compact and thus has a relatively high energy dissipation density. As such, preferred placements for the supplemental electrical load to transfer the heat most efficiently are suggested. Examples of such preferred placements include heat transfer communication with the engine block, coolant, fuel supply and intake air. Specifically, such supplemental electrical load may take the form of an engine block heater, an engine coolant heater, an engine intake air heater or an engine fuel heater. Other electrical loads such as exhaust sensor heaters and body electrical loads including electrically heated mirrors and backglass are also contemplated by the present invention. Preexisting vehicle electrical loads utilized as supplemental electrical loads may be controlled by parallel redundant circuitry to the normal control circuitry or by adapting the normal control circuitry for such loads.

Figure 4:
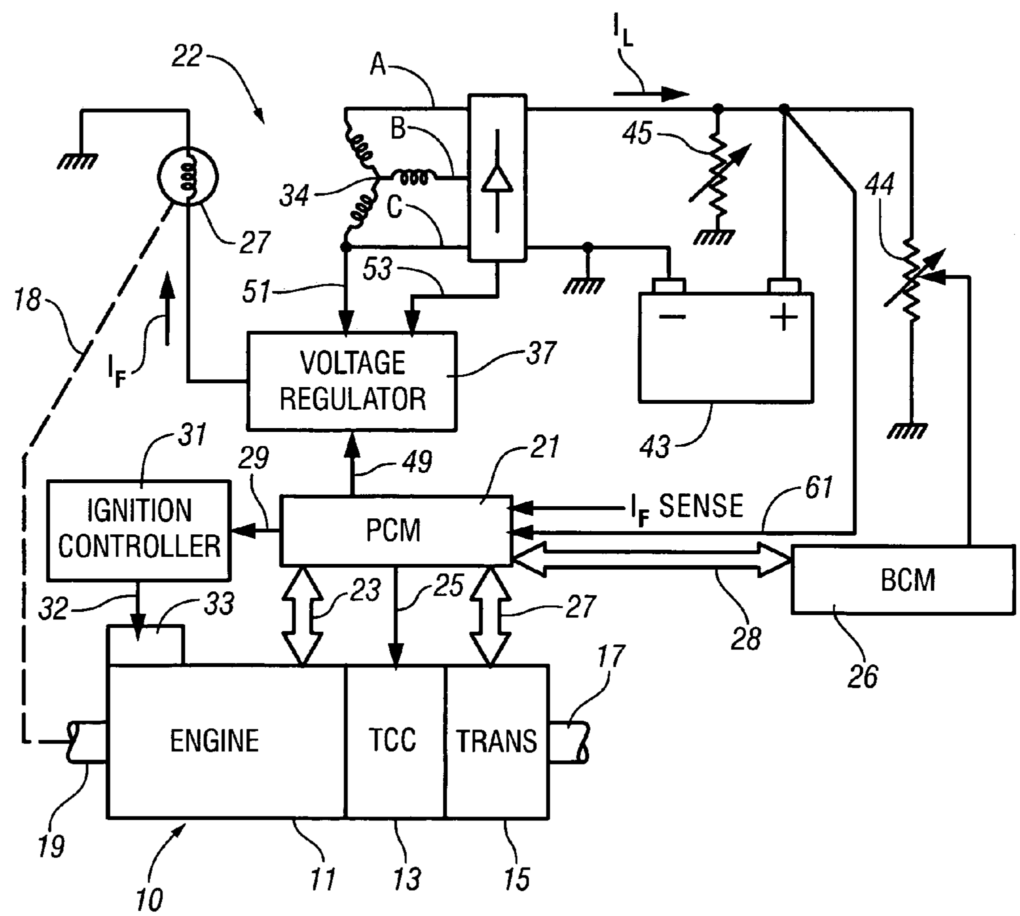
FIG. 4 is a schematic illustration of a vehicle powertrain and electrical system in accordance with another embodiment of the present invention.

FIG. 4 illustrates an alternative embodiment of the present invention that may be a more desirable implementation wherein preexisting vehicle electrical loads may be utilized as the supplemental load 44. FIG. 4 illustrates many of the same features as FIG. 1 with the same reference numerals that are used between the two figures corresponding to the same features. Repetition of the same features is not made herein; however, certain differences are described as follows. Preexisting vehicle electrical loads, particularly high power consuming body electrical loads such as glass defrosters (including electrically heated mirrors and backglass), are commonly controlled by a body control module (BCM) or other control unit apart from the PCM. BCM 26 is shown in two-way communication with PCM through a serial bus 28 or alternative means. BCM 26 is responsive to operator requests, such as from momentary switch inputs, to control such loads into and out of the circuit. Load switching may be accomplished by way of relays controlled by BCM outputs or directly through power transistors or drivers within the BCM. Line 30 from the BCM represents the control line for supplemental electrical load 44. In accordance with the present invention, the PCM communicates requests for supplemental electrical loads via bus 28 and the BCM responds by switching supplemental electrical loads into the circuit. Additionally, even high voltage loads that are energized at regulated or unregulated levels higher than the system voltages may provide supplemental electrical loading in accordance with the present invention provided that the regulation of normal electrical loads is maintained. One such vehicle system adaptable for such use is disclosed in U.S. Pat. No. 4,780,619, the contents of which are incorporated herein by reference.

Figure 2:
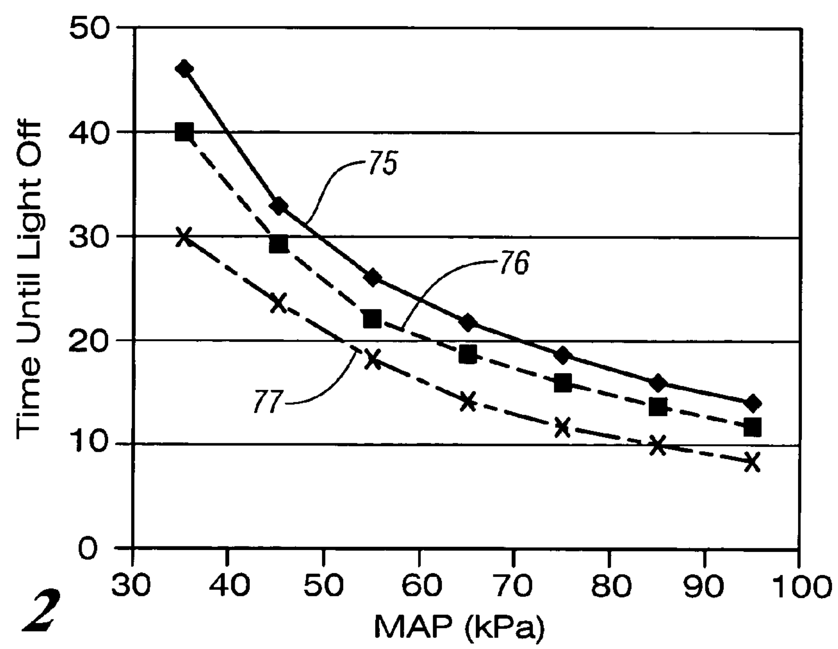
FIG. 2 is a graphic illustration of the general temperature response of a vehicle exhaust system to increased loads at various loads for various degrees of spark retard.

With the significant vehicle systems related to certain exemplary embodiments of the present invention having thus been described with reference to FIGS. 1 and 4, reference is now made to FIG. 2. Three curves labeled 75, 76 and 77 are shown plotted against a pair of axes. The curves represent various times in seconds that a particular portion of a vehicle exhaust system takes to reach a target temperature T from a cold start ambient temperature condition and at various engine loads. In the present example, the ambient temperature is substantially 25 degrees C. and the target temperature T is substantially 350 degrees C. Engine load is represented across the horizontal axis where manifold absolute pressure (MAP) is displayed, it being understood that MAP is a generally accepted indicator of engine load under stoichiometric engine operation for a particular engine operating at a given spark timing. Each of the various lines 75, 76 and 77 correspond to different spark retard applications of 5, 15 and 25 degrees after top dead center, respectively. The movement along each of the curves in the figure is demonstrative of the reductions in time to temperature T resulting from increases in engine load while the curve shifting embodied in the figure in accordance with larger spark retard is demonstrative of the reductions in time to temperature T resulting therefrom. In accordance with the method and apparatus of the present invention, engine load is increased by providing supplemental electrical load to the alternator and time to temperature T is decreased as a result. In accordance with another aspect, additional reductions in time to temperature can be achieved by applying spark retard to the engine in conjunction with the supplemental electrical load presented to the alternator. Increasing the engine speed is also another control factor that if coupled with the supplemental electrical load may provide additional reductions in time to temperature due to increased volumetric and mass throughput of the engine. However, it is an advantage of the present invention that increases in engine speed may be attenuated or avoided with certain embodiments thereof.

Figure 3:
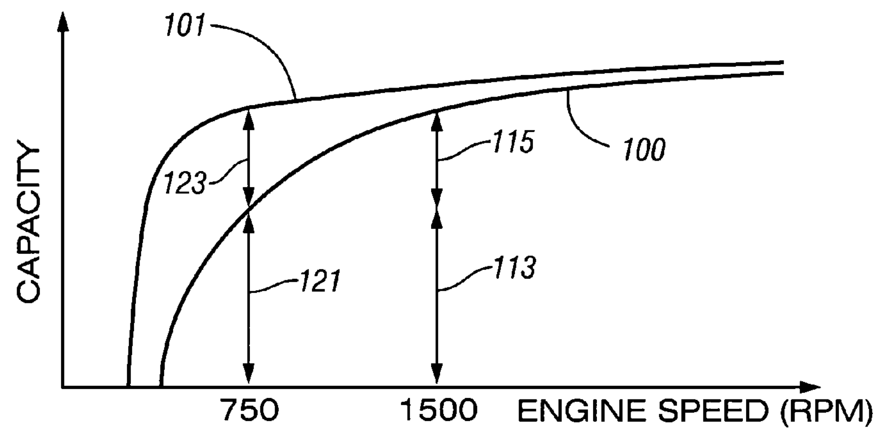
FIG. 3 is a graphic illustration of the general output characteristics of an automotive alternator at various engine speeds and with controlled and uncontrolled bridge rectifier arrangements.

With reference now to FIG. 3, a typical power output capacity curve of a vehicle alternator is shown therein and labeled 100. Generally, the power output capacity is higher at higher rotational speeds. Output is relatively low at low engine speeds such as 750 RPM and substantially higher at higher engine speeds such as 1500 RPM. At 1500 RPM, the power consumed by the nominal electrical load is represented by region 113. The additional capacity 115, or any portion thereof, may be provided to the supplemental electrical load. At lower speeds such as 750 RPM, the nominal electrical load may consume substantially all of the alternators output capacity 121. Hence, additional loads vis-à-vis electrical loading of the generator would typically require engine operation at the higher RPM. Such operation may be objectionable to the operator since such high engine speed may seem to be excessive. In accordance with another aspect of the present invention, the power factor of the alternator may be manipulated to achieve higher output capacity at lower RPM as exemplified by the curve labeled 101. One exemplary apparatus and method for accomplishing such power factor control is described in U.S. Pat. No. 5,773,964, the contents of which are incorporated herein by reference. Therein, an actively controlled bridge rectifier enables current/voltage phase control to effect alternator output control while simultaneously maintaining alternator regulation. Hence, the additional capacity region 123 attributable to power factor control is available at lower RPM for adding torque to the accessory drive via the alternator.

Figure 5:
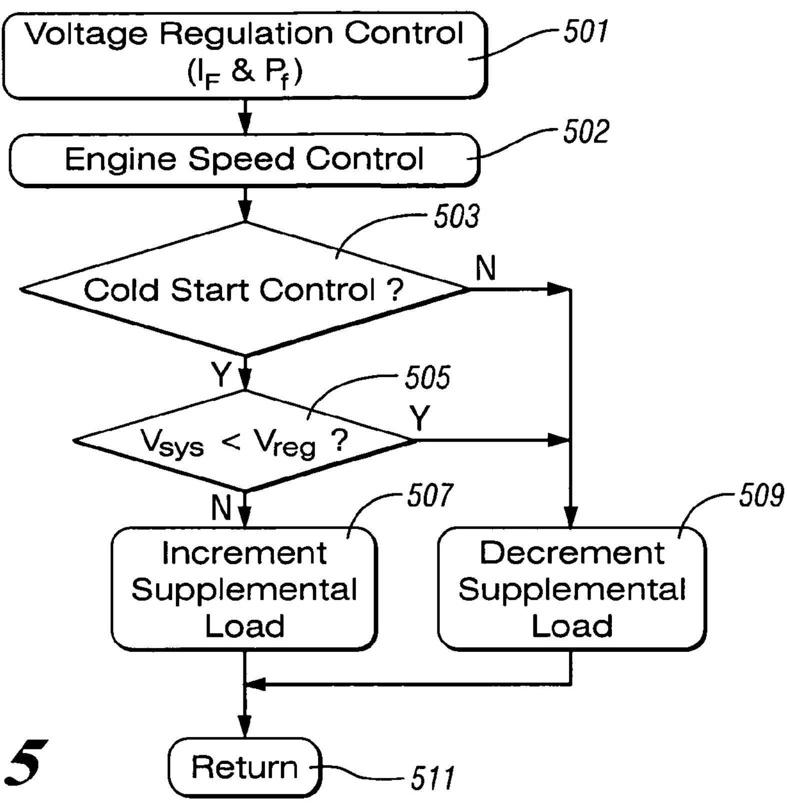
FIG. 5 is a flow chart representing various steps for implementation by one or more electronic controllers in carrying out the present invention; and, FIG. 6 is a graphic illustration of an alternate control methodology in accordance with the present invention.

FIG. 5 is a flowchart for steps as may be executed by one or more controllers including the PCM 21, BCM 26 and voltage regulator 37 in carrying out the method of the present invention wherein certain generator parameters are used in the determination of the supplemental electrical load to be invoked. The steps may be a part of a much larger group of routines implementing various powertrain, body accessory or alternator controls not shown herein. The routine begins at step 501 which represents alternator regulation control. As described herein, the alternator is voltage controlled or regulated to a setpoint system voltage $V_{reg}$ through adjustments to the field current $I_F$. Where power factor control of the alternator is practiced, the alternator output can be increased beyond that of a passive bridge rectified implementation by adjusting the output current/voltage phase. Next, step 502 represents engine speed control wherein engine speed is controlled to a predetermined profile, including a constant speed. In accordance with the present invention, a cold start engine speed will generally be higher than a warm start engine speed. This allows a greater thermal contribution to the exhaust system facilitated by the more frequent fuel charge burning. However, as previously alluded to, a benefit of the present invention is that excessive engine speeds, which might be objectionable to the vehicle operator, may be avoidable through the present invention also. Implementation will be a balance between these competing criteria. In any case, the engine speed control adjusts the engine load operating point to meet the load presented to it and maintain the desired engine speed. Higher engine loading requires more massive fuel/air cylinder charges, the limiting factor being how much air can be ingested into the engine. Maximum airflow is of course achieved with the least amount of intake restriction. Hence, in a throttled engine a control which affords full throttle authority or large air bypasses thereabout is most preferred. For gasoline engines, systems having throttle controlled by motors (electronic throttle controls), therefore, are preferred for the most aggressive implementation of the present invention. A check is made at step 503 to determine whether it is desirable to start or continue the cold start control. For example, if certain predetermined conditions are present, such as enough time passage since the previous ignition cycle and operation within a certain window since the present ignition cycle, step 503 will be answered in the affirmative and control passed to step 505. If it is not desirable to initiate or continue the cold start control then control passes to step 509 which controllably releases the supplemental load then passes control to step 511 whereat the routine is exited. At step 505 a determination is made whether additional alternator output capacity is available for consumption by the supplemental load. If system voltage $V_{sys}$ is below regulated setpoint voltage $V_{reg}$ then the total electrical load upon the electrical system exceeds the regulation capacity of the alternator. In such a situation, step 509 is invoked and the supplemental load is backed off or reduced. Subsequent loops through the routine would then stabilize the supplemental load at a point where the alternator regulation is effective. Where alternator regulation is effective, system voltage $V_{sys}$ has not sagged below regulation voltage $V_{reg}$ and control passes to step 507. At step 507 the supplemental electrical load may be further increased and the routine exited at step 511.

Another implementation of the invention is now described with reference to FIG. 6 which graphically illustrates an alternate control methodology. A desired engine speed profile 601 is established, for example around 1200 to 1400 RPM, which would provide for engine speeds that are acceptable to the operator and that produce increased volumetric and mass throughput of the engine. Profile 601 in the present example trends downward toward lower speeds over time. Other profiles, including constant and increasing engine speed, are equally applicable to the present method. A desired fueling profile 603 is also established which would provide for increased fuel delivery during the warm-up period subsequent to a cold start. Of course, the intake air which is provided to the engine together with the fuel to establish the cylinder charge will similarly be increased in order to maintain the desired air/fuel ratio which is preferably close to stoichiometric so as to avoid excessive hydrocarbon tailpipe emissions. Fueling profile 603 represents, for example, an injector pulse width profile. Since a cold start is characterized by an open loop operation, the fuel/air schedules are look-up table provided and may be adaptively adjusted or trimmed during actual closed loop engine operation. Subsequent to engine crank and start at some time T0+, the cylinder charge is delivered in accordance with the fueling profile 603. The observed engine speed 605 rises rapidly toward the desired engine speed profile 601. Engine speed is then controlled by varying the supplemental electrical load as previously described which serves to load the engine. Well known PID controls may be employed to converge the engine speed error to a minimum by appropriately manipulating the magnitude of the supplemental electrical load. The supplemental electrical load control is represented by line 607 in the figure, for example as a PWM signal, to vary the magnitude of the supplemental load seen by the generator in accordance with the speed error control.

Figure 6:
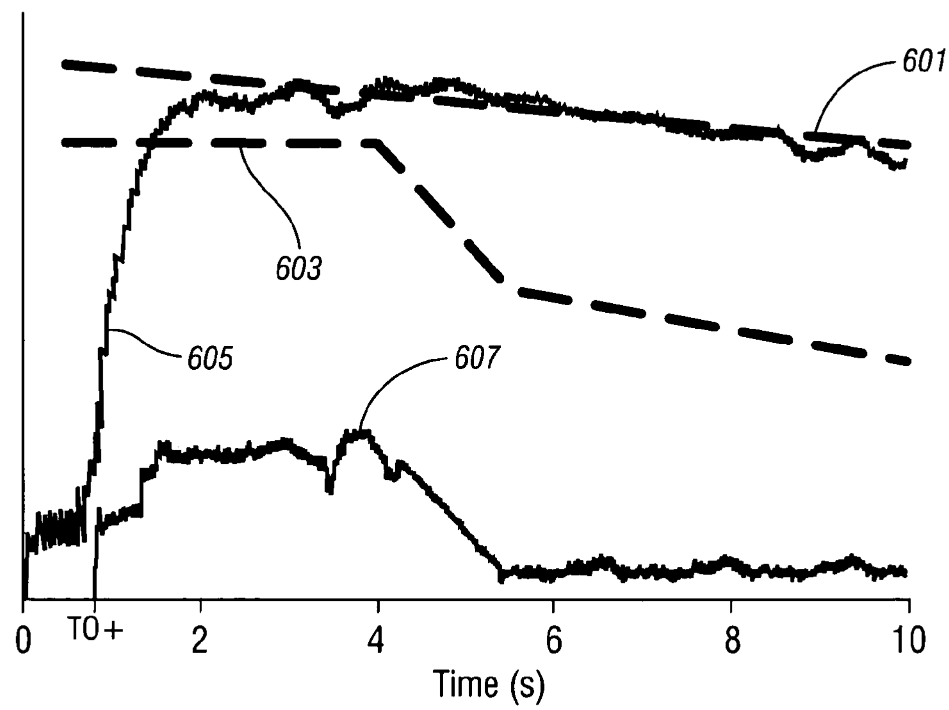

As a variation on the control described with respect to FIG. 6, a supplemental load target or profile may be established and the cylinder fuel and air charge could be controlled to maintain the engine speed in accordance with the desired engine speed profile. However, it is preferred to control engine speed to the desired profile by adjusting the supplemental electrical load and providing the cylinder charge in accordance with a predetermined schedule since more stable tailpipe emissions may result.

The various exemplary embodiments of the present invention may also be combined with other engine controls, such as spark retard controls, to further enhance the accelerated heating of exhaust components provided by the present invention.

The present invention has been described with respect to certain preferred embodiments and variations herein. Other alternative embodiments, variations and implementations may be practiced without departing from the scope of the invention which is to be limited only by the claims as follow:

What is claimed is:

1. Apparatus for cold start heating of exhaust system components in an automobile comprising an internal combustion engine including an engine controller effective to control engine speed by adjusting the engine load operating point comprising:

a generator driven by the internal combustion engine and providing a regulated output therefrom; and, a controller adapted for determining when cold start heating of exhaust system components is required and effective to electrically couple a supplemental electrical load to the regulated output from the generator to increase engine heat output when cold start heating of exhaust system components is required.

2. The apparatus as claimed in claim 1 wherein said supplemental electrical load comprises a resistive load.

3. The apparatus as claimed in claim 2 wherein said supplemental electrical load seen by the generator is variable.

4. The apparatus as claimed in claim 3 wherein said supplemental electrical load comprises means for PWM control of the resistive load.

5. The apparatus as claimed in claim 2 wherein said supplemental electrical load comprises a preexisting vehicle electrical load.

6. The apparatus as claimed in claim 5 wherein said supplemental electrical load seen by the generator is variable.

7. The apparatus as claimed in claim 6 wherein said supplemental electrical load comprises means for PWM control of the resistive load.

8. The apparatus as claimed in claim 2 wherein said resistive load is selected from the group consisting of a power resistor, a rheostat, an engine block heater, an engine coolant heater, an engine intake air heater, an engine fuel heater, an exhaust gas sensor heater, a glass defroster, a seat heater and combinations thereof.

9. The apparatus as claimed in claim 8 wherein said supplemental electrical load seen by the generator is variable.

10. The apparatus as claimed in claim 1 wherein said controller is adapted for determining when cold start heating of exhaust system components is no longer required and effective to electrically decouple the supplemental electrical load from the output of the generator.

11. The apparatus as claimed in claim 1 wherein the generator is an alternator including an actively controlled bridge rectifier effective to controllably vary alternator output characteristics.

12. Method for cold start heating of exhaust system components in an automobile comprising an internal combustion engine, an engine controller and an electric generator drivingly coupled to the engine and having a regulated electrical output:

providing a supplemental electrical load to the regulated output to provide torque load to the engine; and, controlling engine speed to a predetermined engine speed profile.

13. Method far cold start heating of exhaust system components as claimed in claim 12 wherein controlling engine speed to a predetermined engine speed profile comprises controlling engine speed through fuel charge adjustments.

14. Method for cold start heating of exhaust system components as claimed in claim 12 wherein controlling engine speed to a predetermined engine speed profile comprises controlling engine speed through supplemental electrical load adjustments.

15. Method for cold start heating of exhaust system components as claimed in claim 13 wherein said supplemental electrical load is provided in accordance with monitored generator parameters.

16. Method for cold start heating of exhaust system components as claimed in claim 13 wherein said supplemental electrical load is provided in accordance with a predetermined load profile.

17. Method for cold start heating of exhaust system components as claimed in claim 14 comprising controlling fuel charge in accordance with a predetermined fuel charge profile.

18. Method for cold start heating of exhaust system components as claimed in claim 12 further comprising retarding engine spark timing.

19. Apparatus for cold start heating of exhaust system components comprising:

an electrical generator having a regulated output coupled to nominal electrical loads;

an internal combustion engine drivingly coupled to the generator; and, a computer based control operatively coupled to the internal combustion engine and generator, said control including a set of program instructions effective to coordinate engine fueling and generator electrical loading to control engine speed to a predetermined engine speed profile at greater than nominal engine loads.

20. The apparatus as claimed in claim 19 wherein the computer based control is selected from the group consisting of a powertrain controller, a vehicle body controller, and combinations thereof.

21. The apparatus as claimed in claim 19 wherein the electrical generator comprises an alternator including a field winding and a bridge rectifier, wherein said regulated output is regulated by field current control.

22. The apparatus as claimed in claim 21 wherein said bridge rectifier comprises a controlled bridge rectifier, and wherein said regulated output is additionally regulated by power factor control.

* * * * *